United States Patent [19]

Yamaguchi et al.

[11] Patent Number: 5,329,517
[45] Date of Patent: Jul. 12, 1994

[54] OPTICAL INFORMATION RECORDING AND REPRODUCING APPARATUS UTILIZING A PLURALITY OF RECORDING LIGHT SPOTS

[75] Inventors: Eiji Yamaguchi, Sagamihara; Susumu Matsumura, Kawaguchi; Hiroaki Hoshi, Yokohama; Masakuni Yamamoto, Yamato; Hideki Morishima, Atsugi, all of Japan

[73] Assignee: Canon Kabushiki Kaisha, Tokyo, Japan

[21] Appl. No.: 104,605

[22] Filed: Aug. 11, 1993

Related U.S. Application Data

[63] Continuation of Ser. No. 797,948, Nov. 26, 1991, abandoned.

[30] Foreign Application Priority Data

Nov. 27, 1990 [JP]  Japan .................................. 2-321117

[51] Int. Cl.⁵ .............................................. G11B 7/00
[52] U.S. Cl. ............................... 369/110; 369/100; 369/118
[58] Field of Search ............... 369/100, 110, 112, 118, 369/121, 122

[56] References Cited

U.S. PATENT DOCUMENTS 4,953,152  8/1990  Ito et al. .......................... 369/44.39
4,982,393  1/1991  Matsushita et al. ............. 369/44.32
5,056,080  10/1991  Russell .............................. 369/100

Primary Examiner—Paul M. Dzierzynski
Assistant Examiner—James Beyer
Attorney, Agent, or Firm—Fitzpatrick, Cella, Harper & Scinto

[57] ABSTRACT

An optical information recording and reproducing apparatus for recording information pits on an information track by irradiating a light beam focused into a fine spot onto the information track of an optical information recording and reproducing medium, includes a device for forming a plurality of recording light spots on the information track transversely to the information track.

15 Claims, 11 Drawing Sheets

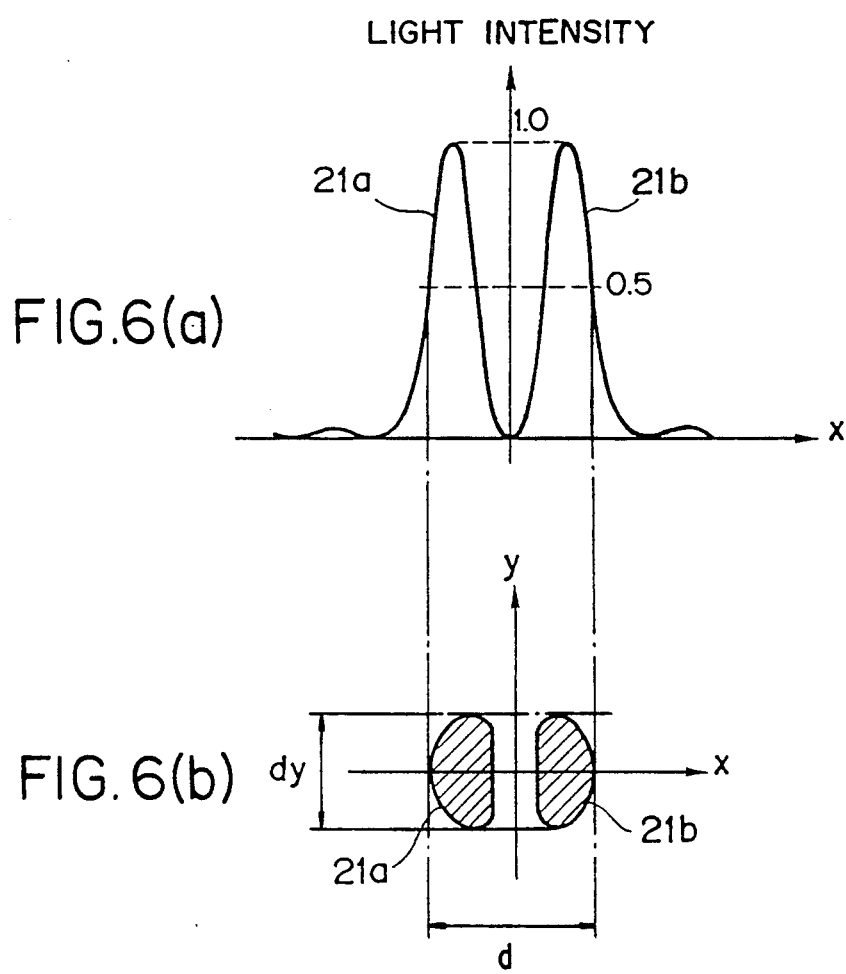

OPTICAL INFORMATION RECORDING AND REPRODUCING APPARATUS UTILIZING A PLURALITY OF RECORDING LIGHT SPOTS

This application is a continuation of prior U.S. application Ser. No. 07/797,948 filed Nov. 26, 1991, now abandoned.

BACKGROUND OF THE INVENTION

1. Field of the Invention

The present invention relates to an apparatus for optically recording and reproducing information, and more particularly to an optical information recording and reproducing apparatus which is suitable to a magnetic field modulation system.

2. Related Background Art

An optical memory such as an optical disk or an optical card has been recently attracting notice as a large capacity memory having a low cost per bit. Among others, a magneto-optical disk, which is a magneto-optical recording medium that permits erasing of information and an application thereof to an external recording unit of a computer and a memory for an image file, has been extensively studied.

The magneto-optical disk recording system includes a light modulation system and a magnetic field modulation system. In the light modulation system, an intensity-modulated laser beam is irradiated while a constant biasing magnetic field is applied to the magneto-optical disk. In the magnetic field modulation system, a modulated biasing magnetic field is applied while a constant intensity laser beam is irradiated. Of those two systems, in order to overwrite information, that is, record new information while erasing previously recorded information, the magnetic field modulation system is advantageous because the medium structure of the magneto-optical disk may be simple. A common information recording method is a mark interval recording method in which an interval (or position) of a mark called a domain on the magneto-optical disk is modulated to record information. On the other hand, a mark length recording method which can increase a recording density by approximately 1.5 times by modulating a length of the mark to record information has also been studied. In high density recording by the mark length recording method, the magnetic field modulation system is also advantageous because it is hardly restricted by the size of a light spot or light intensity distribution.

FIG. 1 shows a configuration of a magneto-optical disk and peripheral units in the magnetic field modulation system. In FIG. 1, numeral 7 denotes a semiconductor laser used as a light source. A laser beam thereof is collimated by a collimator lens 6 and converted to a circular light beam by a beam shaping prism 5. It passes through a beam splitter 4, is focused by an objective lens 3 and is directed to a recording layer of a magneto-optical disk 2 as a fine light spot. A magnetic head 1 is arranged above the magneto-optical disk 2 to face the objective lens 3.

On the other hand, the light reflected by the magneto-optical disk 2 passes through the objective lens 3 and the beam splitter 4 and is directed to a beam splitter 9, which splits the reflected light into two light beams, one of which is directed to a reproducing optical system through a one-half wavelength plate 10 and the other is directed to a controlling optical system through a condenser lens 15. In the reproducing optical system, the light transmitted through the one-half wavelength plate 10 is directed to a beam splitter 12 through a condenser lens 11 and it is further split into two light beams. The split light beams are detected by photo-detectors 13 and 14, respectively, and an information signal is derived from the detection outputs. In the controlling optical system, the light transmitted through the condenser lens 15 is split into two light beams by a beam splitter 16. One of the split beams is detected by a photo-detector 19 and the other is detected by a photo-detector 18 through a knife edge 17. A servo signal is derived from the detection signals of the photo-detectors 19 and 18.

When information is to be recorded, a laser beam of a constant intensity is irradiated by the semiconductor laser 7 to apply a thermal bias to the magneto-optical disk 2. As a result, temperature of the recording layer rises beyond a Curie point. Under this state, a biasing magnetic field is applied from the magnetic head 1 to the high temperature region. The biasing magnetic field is modulated by a recording signal and the orientation of magnetization of the recording layer is aligned to the direction of the biasing magnetic field. When the temperature of the recording layer goes down below the Curie point, the orientation of magnetization is held and a domain is formed. Since the light spot usually has a Gaussian distribution of light intensity, a temperature distribution of the heated medium reflects the light intensity distribution and it is gentle. Thus, an isothermal line of the Curie point is not rectangular. As a result, the recorded domain has an arrow shape as shown in FIG. 2A and 2B. FIG. 2A shows domains recorded by the mark interval recording method. The mark shapes are equal and the mark intervals are modulated. FIG. 2B shows domains recorded by the mark length recording method. The length of the marks are modulated and the edge intervals represent the information.

In the prior art magnetic field modulation system, however, when the arrow-shaped domain which corresponds to an information bit is to be reproduced, the arrow-shaped domain is scanned by the circular light spot having the Gaussian distribution in the light intensity distribution. As a result, correlations between the light spot and the domain are different after the arrow and the before the arrow, crosstalk from front and rear adjacent domains are asymmetric, and the sharp portion of the arrow-shaped domain, that is, a high spatial frequency portion is a stable in shape. Accordingly, because of those problems and a poor MTF of the optical system, the prior art apparatus cause an increase in signal jitter, an increase in error rate and a decrease in reliability. Particularly, in the mark length recording method shown in FIG. 2B, the increase in error rate caused by jitter is remarkable because the edge position of the domain represents the information.

SUMMARY OF THE INVENTION

It is an object of the present invention to remove the above-mentioned drawbacks, that is, to provide an optical information recording and reproducing apparatus which reduces error rate and permits the reproduction of information with a high reliability.

The above object of the present invention is achieved by an optical information recording and reproducing apparatus for recording information pits on an information track by irradiating a light beam focused into a fine spot onto the information track of an optical information recording and reproducing medium, comprising means for forming a plurality of recording light spots on the information track transversely to the information track.

DETAILED DESCRIPTION OF THE PREFERRED EMBODIMENTS

Figure 1:
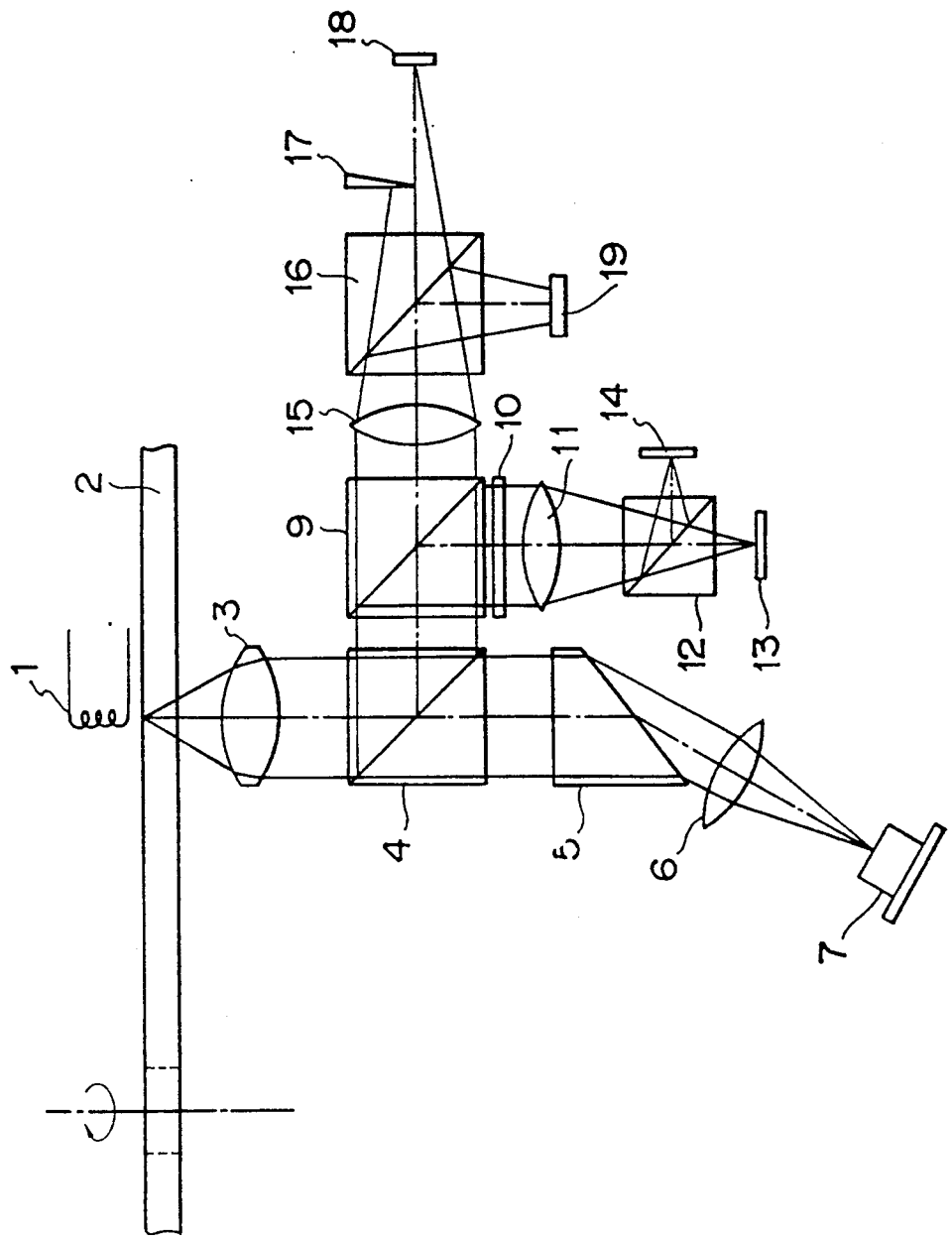
FIG. 1 shows a configuration of a prior art optical information recording and reproducing apparatus of a magnetic field modulation system.
Figure 3:
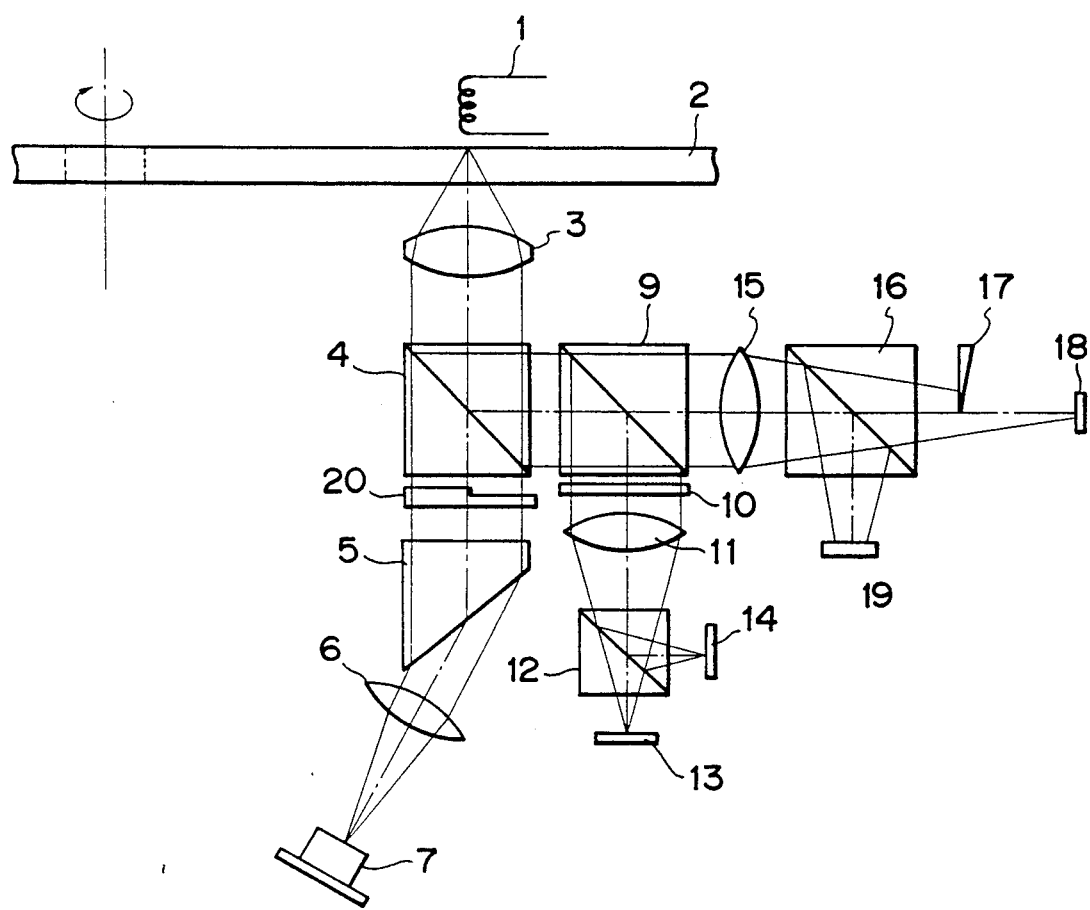
FIG. 3 shows a configuration of one embodiment of an optical information recording and reproducing apparatus.

An embodiment of the optical information recording and reproducing apparatus of the present invention is explained in detail with reference to the drawings. FIG. 3 shows a configuration of the embodiment. In FIG. 3, like elements to those in the prior art apparatus shown in FIG. 1 are designated by like numerals and explanation thereof is omitted.

Figure 4:
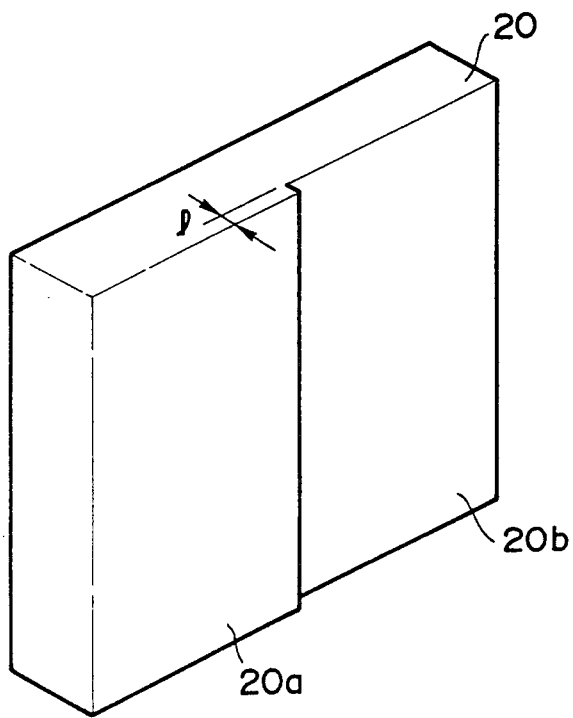
FIG. 4 shows a perspective view of a phase shift device.

In FIG. 3, reference numeral 20 denotes a phase shift device arranged between the polarization beam splitter 4 and the beam shaping prism 5. The other configuration such as the reproducing optical system and the controlling optical system of FIG. 3 is identical to that of FIG. 1, and explanation thereof is omitted. A specific construction of the phase shift device 20 is shown in FIG. 4. The phase shift device 20 has a difference 1 between thicknesses of left and right regions 20$a$ and 20$b$ on both sides of a center line. As a result, light path lengths for the left and right regions 20$a$ and 20$b$ differ from each other by L ($=1$ ($n_s-1$)), where $n_s$ is a refractive index of a material of the phase shift device. In the following description, it is assumed that L$=(n+\frac{1}{2})$ $\lambda$, where n is an integer and $\lambda$ is a wavelength of the semiconductor laser 7.

Figure 5:
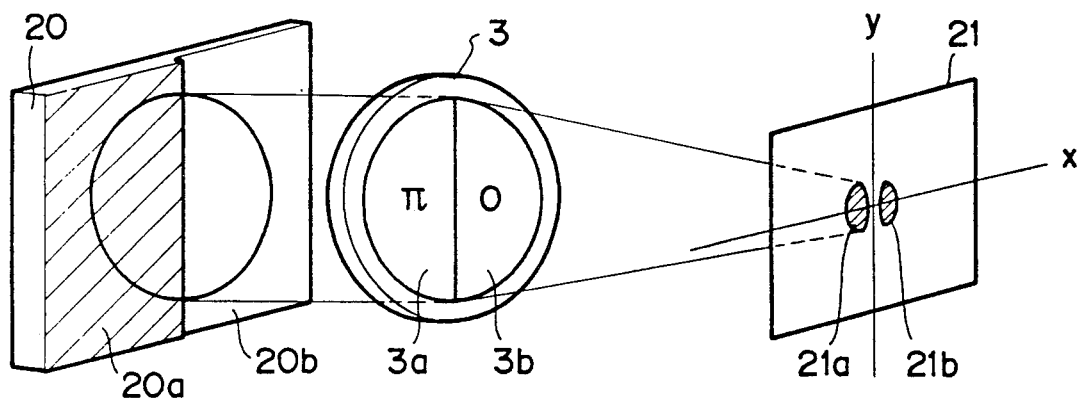
FIG. 5 illustrates formation of two light spots by the phase shift device, FIGS. 6($a$) and 6 ($b$) show a light intensity distribution and a shape of the light spot, respectively, FIGS. 7 ($a$) to 7 ($c$) show processes for forming a domain on an information track by using the light spots of FIG. 6, FIGS. 8 ($a$) to 8 ($c$) show processes for forming a domain by the prior art optical information recording and reproducing apparatus of the magnetic field modulation system.

FIG. 5 shows a light spot formed on a focal plane of the objective lens 3 when the phase shift device 20 is disposed in the light path as described above. The light beam transmitted through the phase shift device 20 is focused by the objective lens 3. Assuming that a phase in a semi-circular region 3$b$ on pupil plane of the objective lens 3 is 0, a phase in the other region 3$a$ is $\pi$. As a result, two light spots 21$a$ and 21$b$ focused by the objective lens 3 are formed on the focal plane 20. The light spots 21$a$ and 21$b$ are symmetric to a Y-axis (track direction) corresponding to the center split line of the phase shift device 20. An X-axis indicates a direction which is transverse to the track direction (track transverse direction).

FIG. 6($a$) shows a light intensity distribution of the light spots 21$a$ and 21$b$, and FIG. 6($b$) shows the shapes thereof. The light intensity includes two peaks in the X-direction, which are symmetrically distributed with respect to the Y-axis. FIG. 6($b$) shows a sectional view of regions having light intensities larger than one half of a peak value. It is seen that the X-direction diameter d of the formed spot is larger than the Y-direction diameter dy.

Figure 7A:
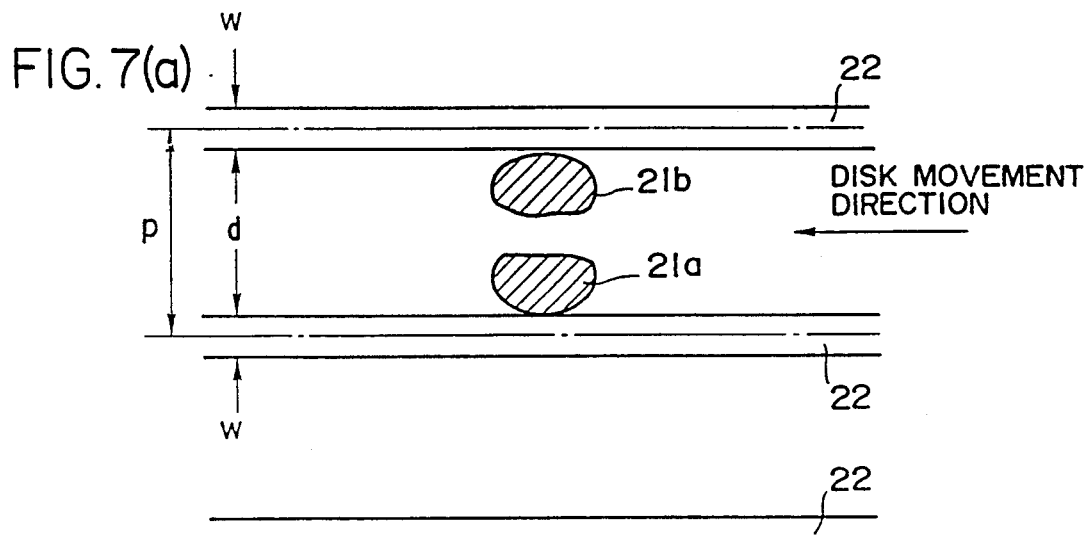
Figure 7B:
Figure 7C:
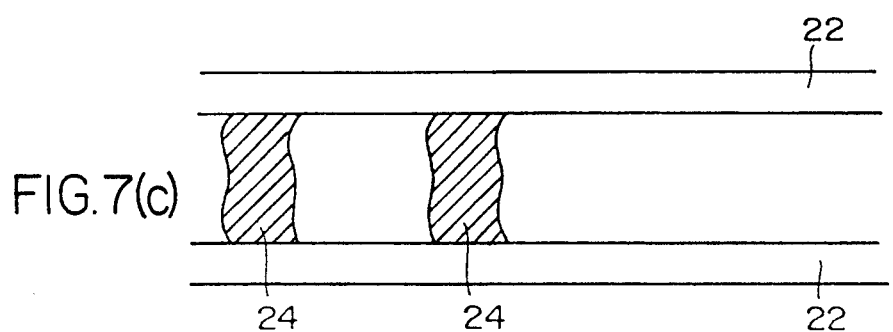

An operation of recording information on the magneto-optical disk by the above light spots is now explained with reference to FIGS. 7 ($a$) to 7 ($c$). In FIG. 7($a$), the light spots 21$a$ and 21$b$ are irradiated to one information track between guide grooves 22 on the recording medium. The direction of movement of the magneto-optical disk is shown by an arrow and the light intensity of the light spot is high enough to record the information. As seen from FIG. 7($a$), the light spots 21$a$ and 21$b$ are irradiated adjacently in the track traverse direction. FIG. 7 ($b$) shows an isothermal curve 23 caused by the irradiation of the light spots, that is, an isothermal curve of a critical temperature to form the record domain. The isothermal curve is approximately linear in a trailing edge because of thermal diffusion.

On the other hand, the biasing magnetic field modulated by the recording signal is applied by the magnetic head 1 shown in FIG. 3 to the temperature elevated region by the irradiation of the light spots. As a result, substantially rectangular domains 24 are formed on the information track in accordance with the isothermal curve as shown in FIG. 7 ($c$). In recording the information, the width of the light spot along the transverse direction of the information track may be increased to further approximate the edge of the record domain to a straight line. However, if it is too large, the domain would be recorded in the adjacent track. Therefore, an appropriate width should be selected. On the other hand, the guide groove 22 has an effect of blocking the thermal diffusion. It is desirable to meet a relation of $$d=p-W$$

where d is a half-value width of the light spot, W is a width of the guide groove 22 and p is a track pitch, as shown in FIG. 7($a$).

Figure 8A:
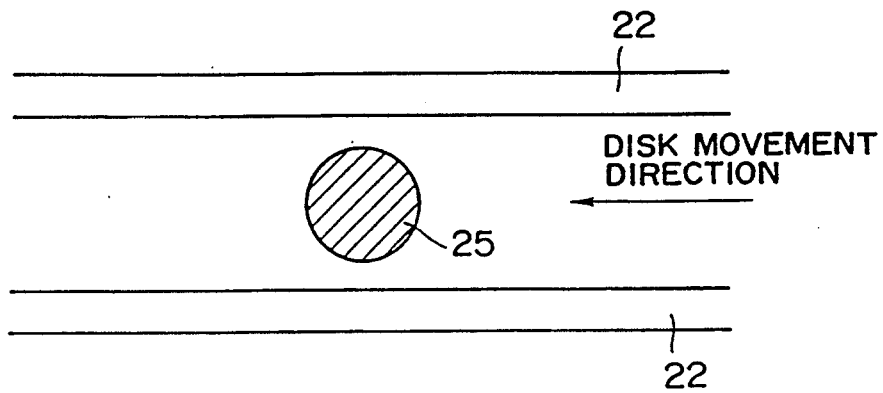
Figure 8B:
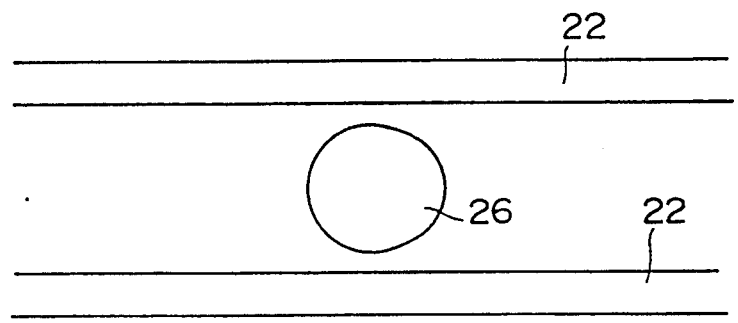
Figure 8C:
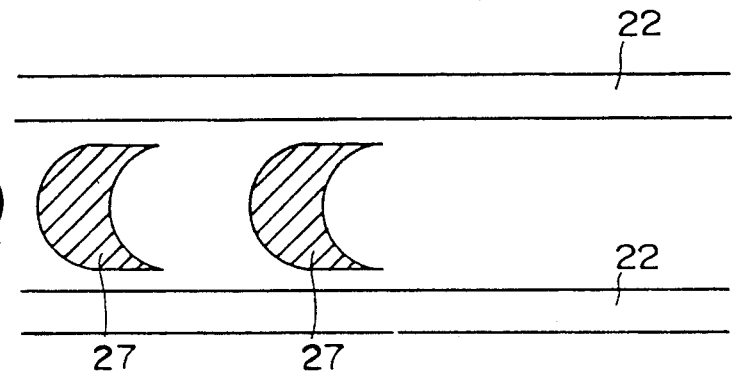

FIGS. 8($a$) to 8($c$) shows a recording process in the prior art magnetic field modulation system. FIG. 8($a$) shows a recording light spot 25, FIG. 8 ($b$) shows an isothermal curve 26 caused by the irradiation of the light spots and FIG. 8($c$) shows a record domain 27 which has an arrow shape.

When the record domain of the present embodiment shown in FIG. 7 ($c$) and the prior art domain are compared, the record domain of the present embodiment has no arrow shape and it is close to a rectangle. That is, the edge at the end of the domain is substantially linear rather than semi-circular as in the prior art, and remarkable improvement has been made in the shape.

Figure 9:
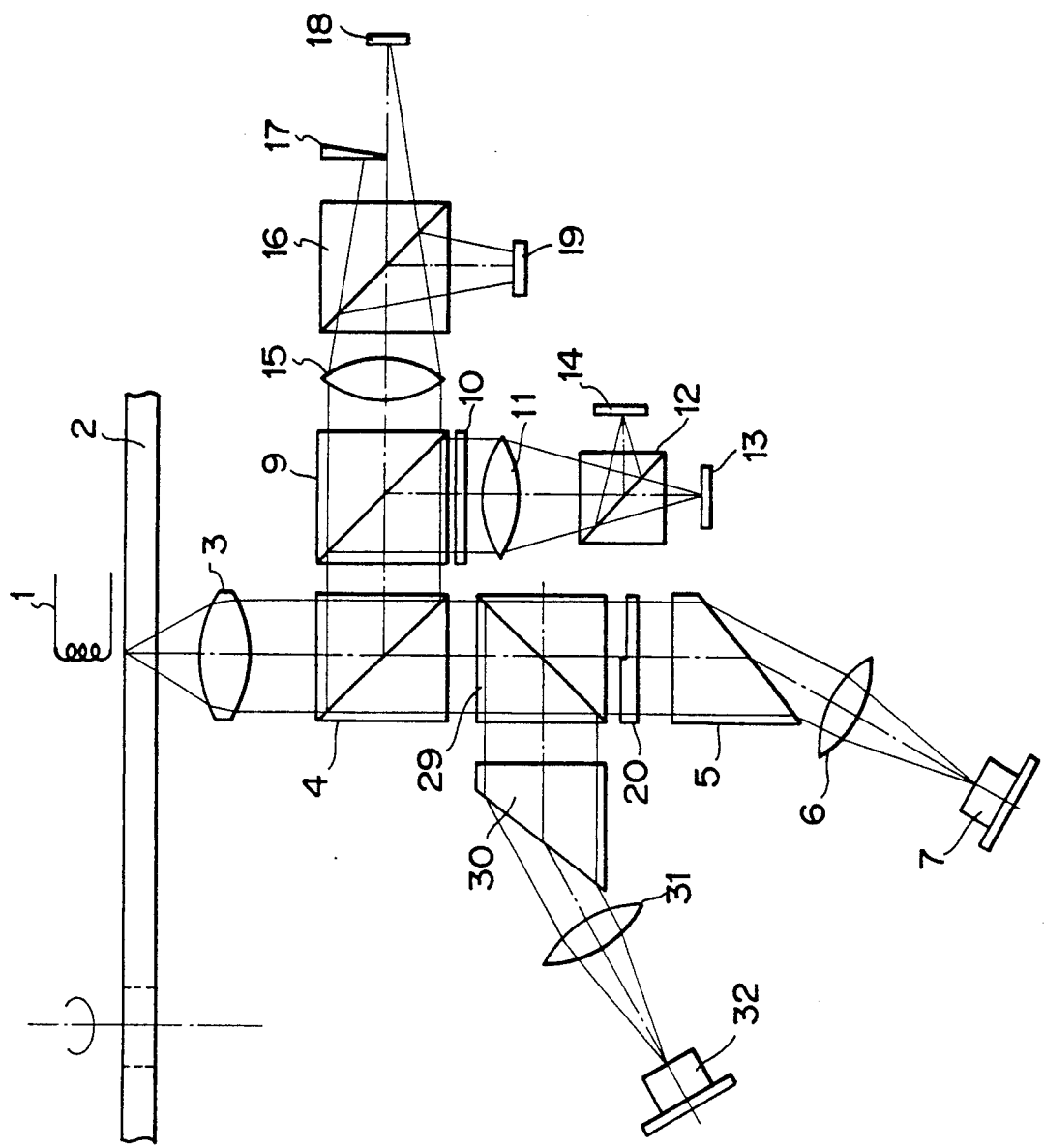
FIG. 9 shows a configuration of another embodiment of the optical information recording and reproducing apparatus of the present invention, FIGS. 10 ($a$) to 10 ($c$) show a light intensity distribution and a shape of a light spot formed in the embodiment of FIG. 9, FIGS. 11 ($a$) to 11($c$) show processes for forming a domain on the information track by using the light spot of FIG. 10.

FIG. 9 shows another embodiment of the optical information recording and reproducing apparatus of the present invention. In the present embodiment, the light spots are formed by two light sources and a semiconductor laser 32 is provided as a new light source. Numeral 31 denotes a collimator lens for collimating the laser beam and numeral 30 denotes a beam shaping prism for converting the beam to a circular beam. The other configuration is identical to that of the embodiment of FIG. 3. The light beam of the semiconductor laser 32 passes through the collimator lens 31, the beam shaping prism 30, the polarization beam splitters 29 and 4 and the objective lens 3, and is directed to the magneto-optical disk 2. Accordingly, the light path from the beam splitter 29 to the magneto-optical disk 2 is essentially identical to that of the light beam of the semiconductor laser 7 which is the other light source.

Figure 10A:
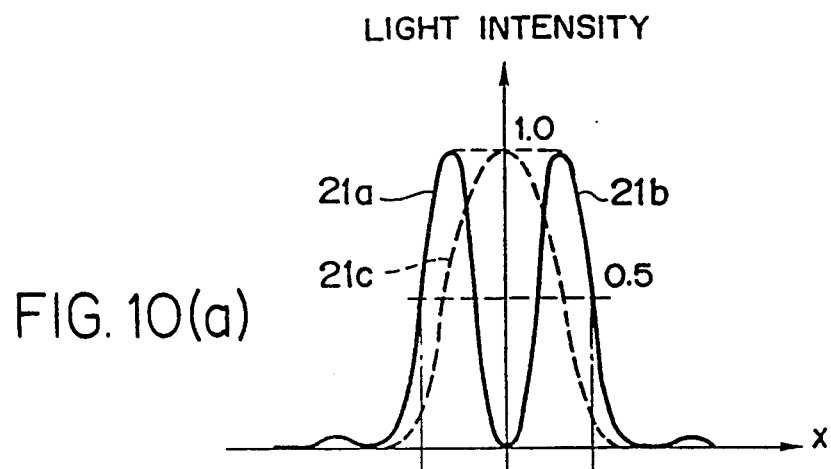
Figure 10B:
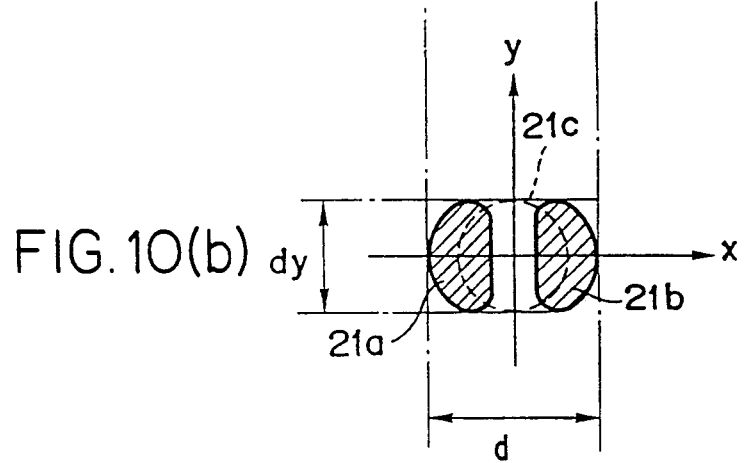
Figure 10C:
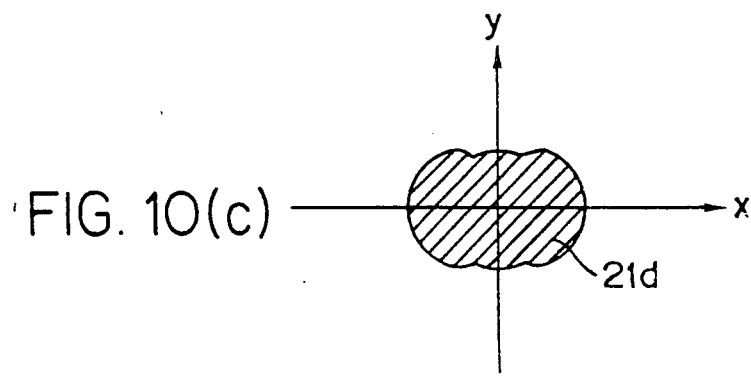

FIGS. 10(a) to 10(c) show a light intensity distribution of the light spots by the semiconductor lasers 7 and 32, shapes thereof and a combined shape. FIG. 10 (a) shows the light intensity distribution. The intensity distribution of the light spots 21a and 21b of the semiconductor laser 7 is identical to that shown in FIG. 6. Reference numeral 21c indicates the intensity distribution of the light spot 21c of the semiconductor laser 32, FIG. 10 (b) shows a sectional view of a region having a light intensity which is larger than one half of the peak value. They are shown as the light spots 21a and 21b. The light spot 21c is a circular spot of the semiconductor laser 32 and it is irradiated between the light spots 21a and 21b such that both sides thereof overlap with the light spots 21a and 21b. As a result, on the medium plane, the light spots 21a and 21b and the light spot 21c are combined to form a light spot 21d which is close to a rectangle in shape, as shown in FIG. 10 (c).

Figure 11A:
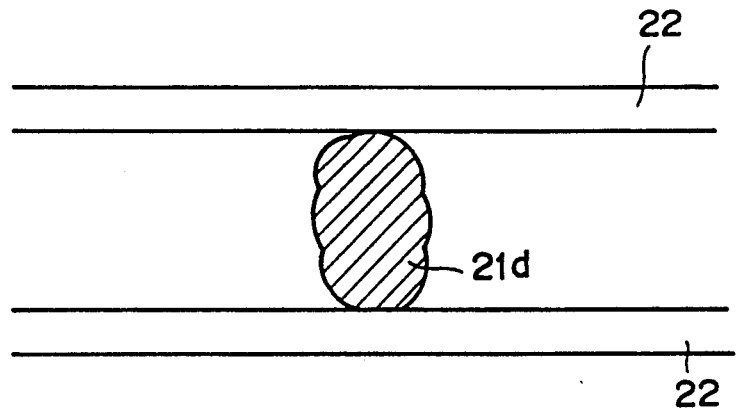
Figure 11B:
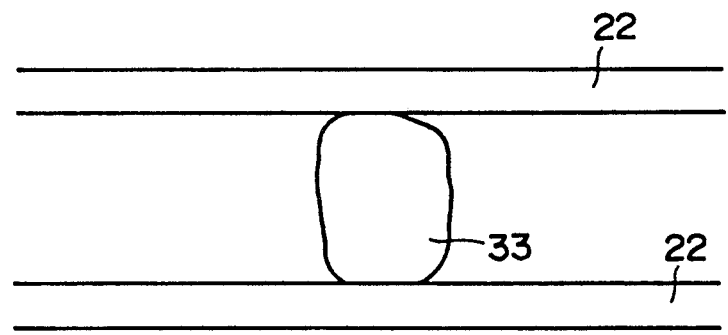
Figure 11C:
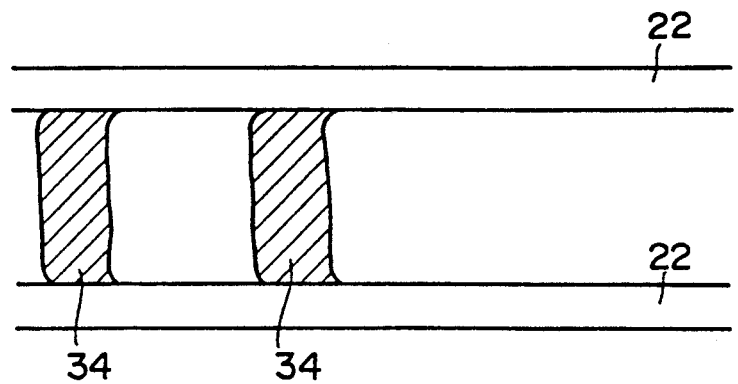

FIGS. 11(a) to 11(c) show a record process. In FIG. 11(a), the combined light spot 21d shown in FIG. 10(c) is irradiated onto the information track. FIG. 11(b) shows an isothermal curve 33 by the irradiation of the light spot 21d and FIG. 11 (c) shows a domain 34 recorded by the application of the biasing magnetic field from the magnetic head and the irradiation of the light spot 21d. In the present embodiment, the shape of the end of the isothermal curve is closer to a straight line than that of the previous embodiment so that the edge of the record domain is closer to the straight line and the domain shape is further improved.

In the present embodiment, the light spots 21a and 21b and the light spot 21c are overlapped as shown in FIGS. 10(a) to 10(c). In order to enhance the light utilization factor, the following configuration is desirable. First, the semiconductor lasers 7 and 32 have different wavelength and the beam splitter 29 is a dichroic beam splitter. Alternatively, the polarization directions of the semiconductor lasers 7 and 32 may be orthogonal and the beam splitter 29 may be a polarization beam splitter. In this configuration, the light utilization factor is enhanced and power consumption of the semiconductor lasers is reduced.

Figure 12:
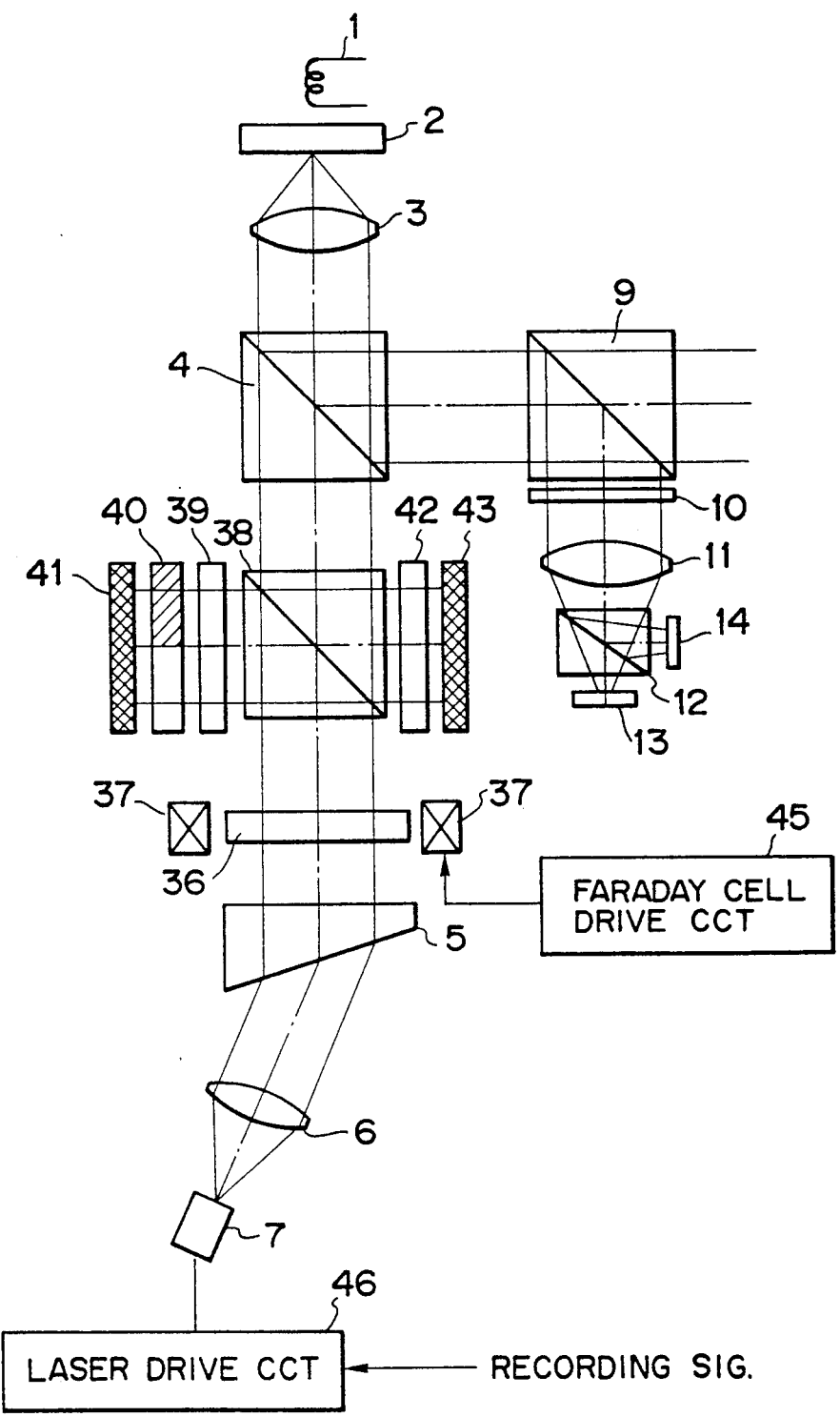
FIG. 12 shows a configuration of a further embodiment of the optical information recording and reproducing apparatus of the present invention.

FIG. 12 shows a further embodiment of the optical information recording and reproducing apparatus of the present invention. In the present embodiment, a light spot having the same light intensity distribution as that of the embodiment of FIG. 9 is attained by one light source.

In FIG. 12, reference numeral 36 denotes a Faraday cell and reference numeral 37 denotes an electro-magnet for applying a magnetic field to the Faraday cell 36.

When the magnetic field is applied to the Faraday cell 36 by the electro-magnet 37, the polarization direction of the linear polarized light rotates to produce a polarized component which is normal to a plane of the drawing (S-polarized component). Accordingly, the light beam transmitted through the Faraday cell 36 has a P-polarized component and an S-polarized component. A Faraday cell driver 45 supplies current to the electromagnet 37. By changing the magnetic field applied to the Faraday cell 37, a ratio of the P-polarized component to the S-polarized component can be varied. When no external magnetic field is applied, the light beam passes through the Faraday cell 36 as the P-polarized component. Numeral 38 denotes a polarization beam splitter which transmits essentially 100% and reflects essentially 0% of the P-polarized component. It reflects essentially 100% and transmits essentially 0% of the S-polarized component. Namely, the P-polarized component is transmitted as it is and the S-polarized component is reflected. In this manner, both components are separated.

Arranged on one side of the polarization beam splitter 38 are a quarter wavelength plate 39, a phase filter 40 and a mirror 41. Arranged on the other side are a quarter wavelength plate 42 and a mirror 43. The S-polarized component reflected by the polarization beam splitter 38 is converted to circular polarization by the quarter wavelength plate 39, passes through the phase filter 40 and is directed to the mirror 41. It is reflected by the mirror 41, passes through the phase filter 40 and the quarter wavelength plate 39 and is changed to the P-polarized component. Assuming that the track direction of the magneto-optical disk 2 is normal to the plane of the drawing, the phase filter 40 acts to cause a phase difference $\pi$ between the upper light beam (hatched) and the lower light beam relative to the optical axis.

The light beam which has gone forward and back through the quarter wavelength plate 39, the phase filter 40 and the mirror 41 is changed to the P-polarized component as described above and it is directed to the polarization beam splitter 38. It passes through the polarization beam splitter 38 and the quarter wavelength plate 42 and is converted to a circular polarized component, which is reflected by the mirror 43, and is directed to the quarter wavelength plate 42 and returns to the S-polarization. The light beam transmitted through the quarter wavelength plate 42 is reflected by the polarization beam splitter 38 and it is combined with the original light beam, and passes through the beam splitter 4 and the objective lens 3 to focus the light spot on the magneto-optical disk 2. The P- and S-polarized components do not interfere with each other because they are orthogonal linear polarized components. The other configuration of the embodiment of FIG. 12 is identical to that of the embodiment of FIG. 3 and explanation thereof is omitted. In FIG. 12, the controlling optical system which detects the servo error signal by the light beam transmitted through the beam splitter 9 is omitted.

Since the P-polarized light spot has a uniform phase, it is identical to the light spot 21c shown in FIGS. 10 (a) and 10 (b) and has one peak on the optical axis. This is called a first spot. On the other hand, since the S-polarized component has a phase difference $\pi$ in the light beam by the phase filter 40 as described above, it has two peaks on both sides of the optical axis as the light spots 21a and 21b have, as shown in FIGS. 10(a) and 10(b). They are called second and third spots. Thus, three light spots are formed on the magneto-optical disk 2. The first spot is centered on the optical axis and the second and third spots are formed on both sides of the first spot. Accordingly, like in the embodiment shown in FIG. 9, three light spots are formed on the information track and the shape of the record domain is close to a rectangle.

In the present embodiment, when the information is to be recorded, the electro-magnet 37 is actuated by the Faraday cell driver 45 so that the external magnetic field is applied to the Faraday cell 36. Thus, the P-polarized component and the S-polarized component are generated. A power ratio thereof is determined by the Faraday cell driver 45. The magnitude of the power is determined by the laser driver 46. The record signal 47 which includes the information to be recorded is applied to the laser driver 46, and the laser beam intensity is modulated by the record signal 47. Accordingly, in the present embodiment, the ratio of intensities of the light spots 21a and 21b and the light spot 21c shown in FIGS. 10(a) and 10(b) are varied by the Faraday cell driver so that the shape of the combined light spot 21d shown in FIG. 10(c) can be controlled to an optimum one to fit to a characteristic of the recording material.

In the optical information recording and reproducing apparatus of the present invention which writes information into the optical recording medium by utilizing the thermal distribution formed by the light spots, the light intensity distribution which is transverse to the information track is appropriately modified. As a result, the shape of the recorded information pit can be significantly improved and the information recording density is effectively improved. It is particularly suitable to the magnetic field modulation system which uses the magneto-optical recording medium, although it is not limited thereto.

In accordance with the present invention, since the shape of the record domain is close to a rectangle, the increase of jitter encountered in the prior art arrow-shaped domain is eliminated and the error rate is significantly improved.

What is claimed is:

1. An optical information recording and reproducing apparatus for recording and reproducing an information pit on and from an information track of an optical information recording medium by irradiating a light beam focused into fine spots to the information track, said apparatus comprising:
    a recording light source for generating a light beam;
    spot forming means arranged in a path of the light beam generated from said recording light source for forming a plurality of recording light spots transversely to the information track on the information recording medium, said spot forming means comprising a focusing objective lens disposed in the light path and a phase shift device facing a pupil plane of the objective lens and having a split line arranged in a direction of the information track, so that the light beam generated by said light source is split into two light spots which are irradiated to the information track; and
    means for reproducing a record domain formed by the recording light spots.

2. An optical information recording and reproducing apparatus according to claim 1, wherein a difference between phases of the light beams on both sides of the split line of said phase device is equal to one half of a wavelength of the light beam generated by said light source.

3. An optical information recording and reproducing apparatus according to claim 1, wherein a track pitch p of the information track, a width W of guide grooves on both sides of the information track and a half-value width d of light intensity of the light spots transverse to the track essentially meet a relation of $p - W = d.$ 4. An optical information recording an reproducing apparatus according to claim 1, wherein said spot forming means comprises means for forming two light spots on the information track and means for forming a light beam from a light source other than said recording light source into light spots located at substantially a midpoint of the two light spots.

5. An optical information recording and reproducing apparatus for recording an information pit on an information track of an optical information recording medium by irradiating a light beam focused into fine spots to the information track, said apparatus comprising:
    a recording light source for generating a light beam; and
    spot forming means arranged in a path of the light beam generated by said recording light source for forming a plurality of recording light spots transversely to the information track on the information recording medium, said spot forming means comprising a focusing objective lens disposed in the light path and a phase shift device facing a pupil plane of the objective lens and having a split line arranged in a direction of the information track.

6. An optical information recording and reproducing apparatus according to claim 5, wherein a difference between phases of the light beams on both sides of the split line of said phase shift device is equal to one half of a wavelength of the light beam generated by said light source.

7. An optical information recording and reproducing apparatus according to claim 5 wherein a track pitch p of the information track, a width W of guide grooves on both sides of the information track and a half-value width d of light intensity of the light spots transverse to the track essentially meet a relation of $p - W = d.$ 8. An optical information recording and reproducing apparatus according to claim 5, wherein said spot forming means comprises means for forming two light spots on the information track and means for forming a light beam from a light source other than said recording light source into light spots located at substantially a midpoint of the two light spots.

9. An optical information recording and reproducing apparatus for recording and reproducing an information pit on and from an information track of an optical information recording medium by irradiating a light beam focused into fine spots to the information track, said apparatus comprising:
    a recording light source for generating a light beam;
    spot forming means arranged in a path of the light beam generated form said recording light source for forming a plurality of recording light spots transversely to the information track on the information recording medium, said spot forming means comprising a Faraday cell disposed in the light path, means for applying a magnetic field to the Faraday cell to change a direction of polarization of the light beam from said light source, and means for causing a predetermined phase difference in one of the polarized components of the light beam transmitted through the Faraday cell; and means for reproducing a record domain formed by the recording light spots.

10. An optical information recording and reproducing apparatus for recording an information pit on an information track of an optical information recording medium by irradiating a light beam focused into fine spots to the information track, said apparatus comprising:

a recording light source for generating a light beam; and spot forming means arranged in a path of the light beam generated by said recording light source for forming a plurality of recording light spots transversely to the information track on the information recording medium, said spot forming means comprising a Faraday cell disposed in the light path, means for applying a magnetic field to the Faraday cell to change a direction of polarization of the light beam from said light source, and means for causing a predetermined phase difference in one of the polarization components of the light beam transmitted through the Faraday cell.

11. A method of recording an information pit onto an information track of an optical information recording medium by irradiating an information track with light beams each focused into a fine spot, said method comprising the steps of:

generating a light beam from a recording light source;

forming two light spots form the light beam generated from the recording light source by a focusing objective lens disposed in a path of the light beam from the recording light source, and a phase shift device facing a pupil plane of the objective lens and having a split line arranged in a direction of the information track; and transversely irradiating the information track with the two light spots to record an information pit onto the information track.

12. A method according to claim 11, wherein a difference between phases of the light beams on both sides of the split line of said phase shift device is equal to one half of a wavelength of the light beam generated by said light source.

13. A method according to claim 11, wherein a track pitch p of the information track, a width W of guide grooves on both sides of the information track and a half-value width d of light intensity of the light spots transverse to the track essentially meet a relation of $$p - W = d.$$

14. A method of recording an information pit onto an information track of an optical information recording medium by irradiating an information track with light beams each focused into a fine spot, said method comprising the steps of:

generating a light beam from a recording light source;

forming two light spots from the light beam generated from the recording light source by a focusing objective lens disposed in a path of the light beam from the recording light source, and a phase shift device facing a pupil plane of the objective lens and having a split line arranged in a direction of the information track;

forming a light spot from a light beam generated from a light source separately provided, at a substantial center portion between the two light spots; and transversely irradiating the information track with the two light spots to record an information pit onto the information track.

15. A method of recording an information pit onto an information track of an optical information recording medium by irradiating an information track with light beams each focused into a fine spot, said method comprising the steps of:

generating a light beam from a recording light source; and forming a plurality of recording light spots transversely to the information track on the information recording medium, from the light beam generated form the recording light source by: (i) disposing a Faraday cell in a path of the light beam form the recording light source, (ii) applying a magnetic field to the Faraday cell to change a direction of polarization of the light beam form the recording light source, and (iii) causing a predetermined phase difference in one of the polarized components of the light beam transmitted through the Faraday cell.

* * * * *

UNITED STATES PATENT AND TRADEMARK OFFICE
CERTIFICATE OF CORRECTION

PATENT NO. : 5,329,517
DATED : July 12, 1994
INVENTOR(S) : Eiji YAMAGUCHI, et al.

Figures 2A, 2B:
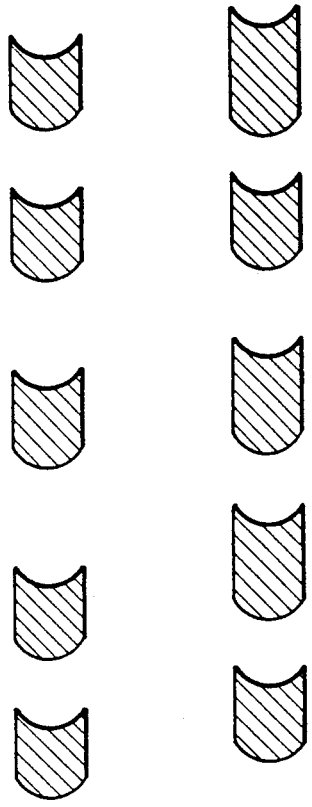
FIGS. 2A and 2B show arrow-shaped domains recorded by a mark interval recording method and a mark length recording method, respectively.

It is certified that error appears in the above-indentified patent and that said Letters Patent is hereby corrected as shown below:

COLUMN 2:

Line 31, "FIG. 2A" should read --FIGS. 2A--;
Line 44, "the" (first occurrence) should be deleted;
Line 47, "a stable" should read --astable--; and
Line 49, "cause" should read --causes--.

COLUMN 8:

Line 10, "an" should read --and--;
Line 40, "claim 5" should read --claim 5,--; and
Line 63, "form" should read --from--.

COLUMN 9:

Line 37, "form" should read --from--.

COLUMN 10:

Line 41, "form" should read --from--; and
Line 42, "form" should read --from--.

Signed and Sealed this

Fourth Day of April, 1995

Attest:

BRUCE LEHMAN

*Attesting Officer*   Commissioner of Patents and Trademarks